United States Patent [19]

Forde et al.

[11] 4,084,553
[45] Apr. 18, 1978

[54] PISTON AND ROD ASSEMBLY WITH DISPLACEMENT FEATURES

[76] Inventors: Louis Forde; Diane Forde, both of 482 Berriman St., Brooklyn, N.Y. 11208

[21] Appl. No.: 724,779

[22] Filed: Sep. 20, 1976

Related U.S. Application Data

[63] Continuation-in-part of Ser. No. 569,090, Apr. 17, 1975, abandoned.

[51] Int. Cl.$^2$ .................. F02B 75/04; F15B 15/24
[52] U.S. Cl. ................................ 123/48 B; 92/13; 92/187; 92/220
[58] Field of Search ............ 123/78 BA, 78 B, 48 B, 123/48 R, 78 E; 92/13, 220, 238, 187, 59; 403/150, 151, 152; 74/599 E

[56] References Cited

U.S. PATENT DOCUMENTS

| | | | |
|---|---|---|---|
| 247,813 | 10/1881 | Ericsson | 74/579 E |
| 1,478,368 | 12/1923 | Bender | 92/187 |
| 1,526,244 | 2/1925 | Shannon | 123/48 B |
| 1,527,296 | 2/1925 | Dudas | 123/48 B |
| 1,605,742 | 11/1926 | Jordan et al. | 74/579 E |
| 1,782,655 | 11/1930 | Jameson | 74/579 E |
| 1,822,322 | 9/1931 | Steele | 403/150 X |
| 1,943,364 | 1/1934 | Betz | 92/187 |

FOREIGN PATENT DOCUMENTS

| | | | |
|---|---|---|---|
| 23,484 of | 1909 | United Kingdom | 123/48 B |

*Primary Examiner*—Irwin C. Cohen

[57] ABSTRACT

An improved piston and rod assembly that can be readily disassembled at several places so that the entire assembly need not be necessarily removed from an engine during servicing, and which includes dismantleable bearings around a cross pin about which the piston is pivotally supported on the piston rod, and a dismantleable bearing that supports the piston rod on a crankshaft, and shims being placable behind the bearing blocks so to selectively change a length of piston stroke within a cylinder.

1 Claim, 3 Drawing Figures

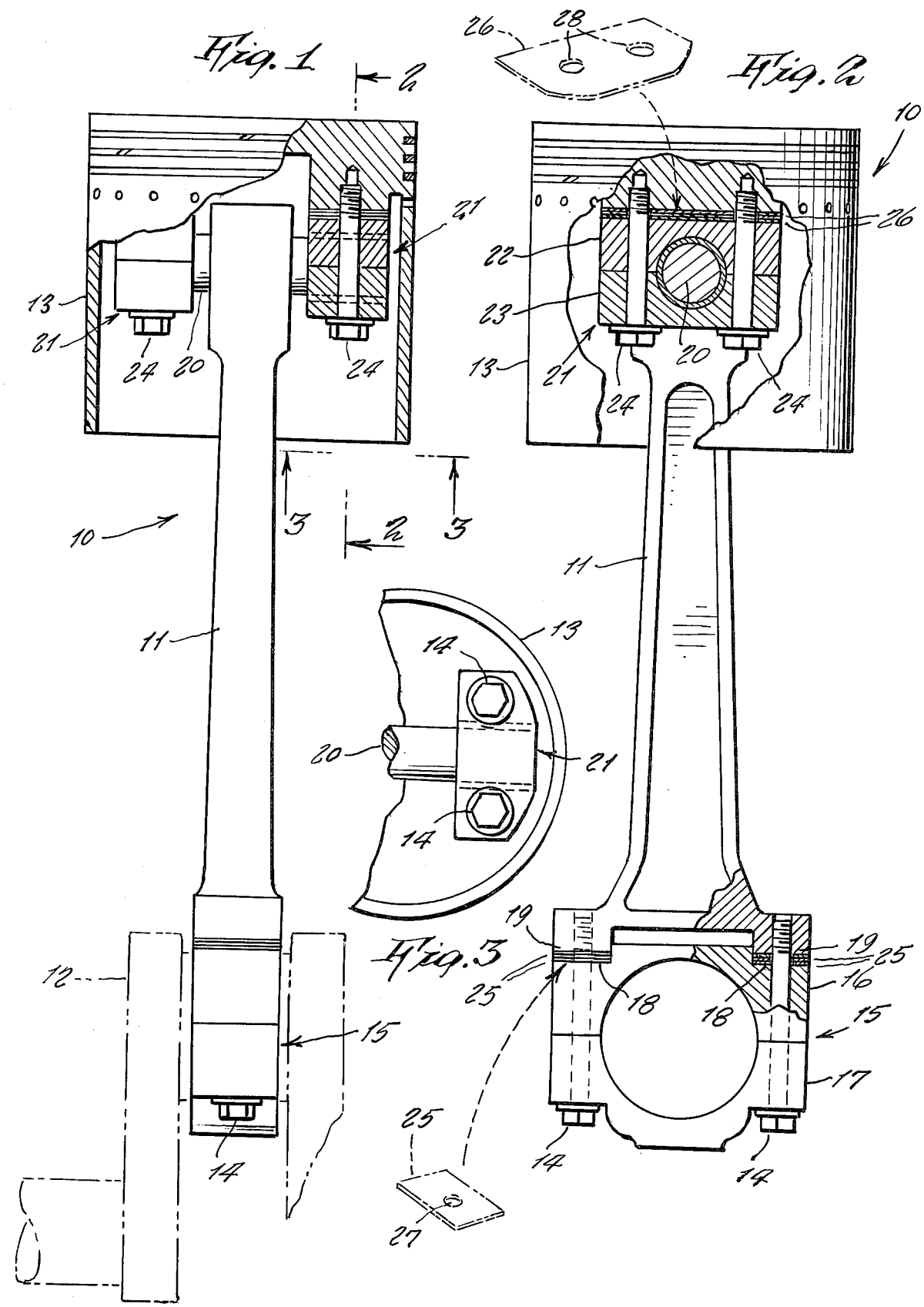

PISTON AND ROD ASSEMBLY WITH DISPLACEMENT FEATURES

This invention which is a continuation in part of Ser. No. 569,090 filed Apr. 17, 1975 and now abandoned relates generally to reciprocal engines, wherein there is a piston rod between a crankshaft and a piston sliding back and forth in a cylinder.

Prior art devices provided various combinations such as unitized pistons, detachable piston heads, annular rings, shims, etc., which were accessible through the top side to provide for different purposes such as for fitting and maintaining predeterminely sized space. Also, rods of varied designs and numbers were employed with spacers to compensate for wear which was subsequently resolved by providing standard and undersize bearing inserts. The dual connecting rod using shims was addressed to vibration which was subsequently resolved by the addition of crankshaft support bearings, journals, and counterweights dynamically balancing the crankshaft.

A principal object of the present invention is to provide a piston and rod assembly wherein the piston rod can be easily disassembled from the piston and from the crankshaft without need of removal of either the piston or crankshaft from the engine.

Another object accordingly is to provide a piston and rod assembly which permits replacement of a broken piston rod without the necessity of removal of the piston.

Still another object is to provide a piston and rod assembly wherein accordingly a piston can be removed, for servicing, from an underside of a cylinder without need to remove a cylinder head off an engine block.

Another object is to provide a piston and rod assembly wherein shims or spacers can accordingly be added or removed adjacent each end of the piston rod so to adjust a length of a piston stroke and thus change a compression ratio in a cylinder.

To soup-up an engine as is generally known in the art is to change the piston displacement in a cylinder. Piston displacement is the difference between two volumes; (1) the total volume of a cylinder when the piston is at bottom dead center, (2) volume of said cylinder when the piston is at top dead center. Compression ratio is the ratio between volume 1 and volume 2. Compression ratio on modern engines range from 7.50 to 1 up to 11.0 or more. Benificially, power and fuel economy are increased as the compression ratio is raised. Other things being equal, the higher the compression ratio the higher the compression pressure obtained at the end of the compression stroke.

Yet another object accordingly, is to provide a piston and rod assembly which therefore will save time and labor in doing certain engine repairs.

Other objects are to provide a piston and rod assembly which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a side view of the invention shown partly in cross section.

FIG. 2 is a view on line 2—2 of FIG. 1, shown partly in cross section.

FIG. 3 is a fragmentary view in direction 3—3 of FIG. 1.

Referring now to the drawing in detail, the reference numeral 10 represents a piston and rod assembly according to the present invention wherein there is piston rod 11 that extends between a crankshaft 12 and a piston 13 reciprocably disposed in cylinder $13^a$.

The piston rod is attached at one end by means of screws 14 to a piston rod crankshaft bearing 15 consisting of bearing blocks 16 and 17 held together also by the same screws 14. The block 16 can include a shoulder 18 at each side and upon which a foot 19 at each side of the piston rod end is placable.

The other end of the piston rod is fitted on a pin 20 which at each end is pivotally supported in bearings 21, consisting of bearing blocks 22 and 23, and which are secured to the underside of the piston 13 by means of screws 24.

As best shown in FIG. 2, shims 25 may be selectively placed between the shoulders 18 and feet 19, and shims 26 may be selectively placed between the block 22 and piston 13 so to alter a length of piston stroke, change a compression ratio or change a balance. Openings 27 and 28 through the shims respectively are provided for clearance of the mounting screws 14 and 24.

Thus there is provided an improved piston and rod assembly with displacement features.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What we claim is:

1. A piston and rod assembly including compression adjustment shims comprising a piston having a crown and skirt depending therefrom, a pin supported at its opposite ends by said piston, the support at each end comprising a separate pair of directly abutting bearing blocks with a hole therethrough for supporting the respective pin end, a plurality of shims between the uppermost bearing block and the crown, and a pair of screws extending through said bearing blocks and shims and threadingly engaged in said crown, a piston rod at one end thereof having means fitted onto said pin and at the other end of said rod defining a pair of spaced feet members, a crankshaft bearing assembly comprising a pair of directly abutting bearing blocks defining a crankshaft opening therethrough, the upper crankshaft bearing block defining a spaced pair of generally right angled shoulders defined by walls supporting a respective plurality of shims therein, said spaced pair of piston rod feet members respectively engaging both a wall of said spaced pair of crankshaft shoulders and said shims, and a pair of screws each respectively passing through said crankshaft bearing blocks and shims and threadingly engaging a respective one of said pair of feet members.

* * * * *